May 1, 1923.
C. C. SHIGLEY
1,453,890
SPEED REGULATING DEVICE
Filed May 14, 1920
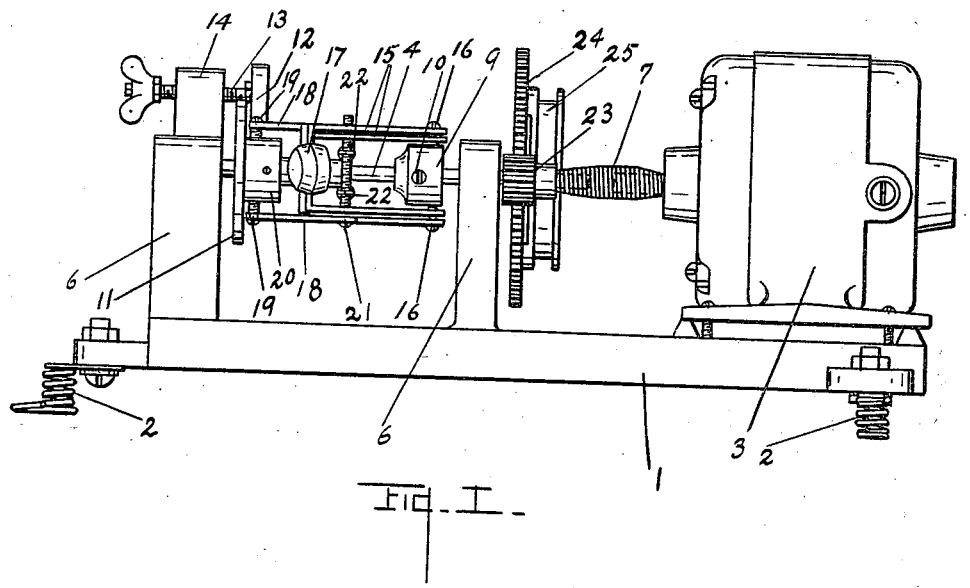
FIG. I.
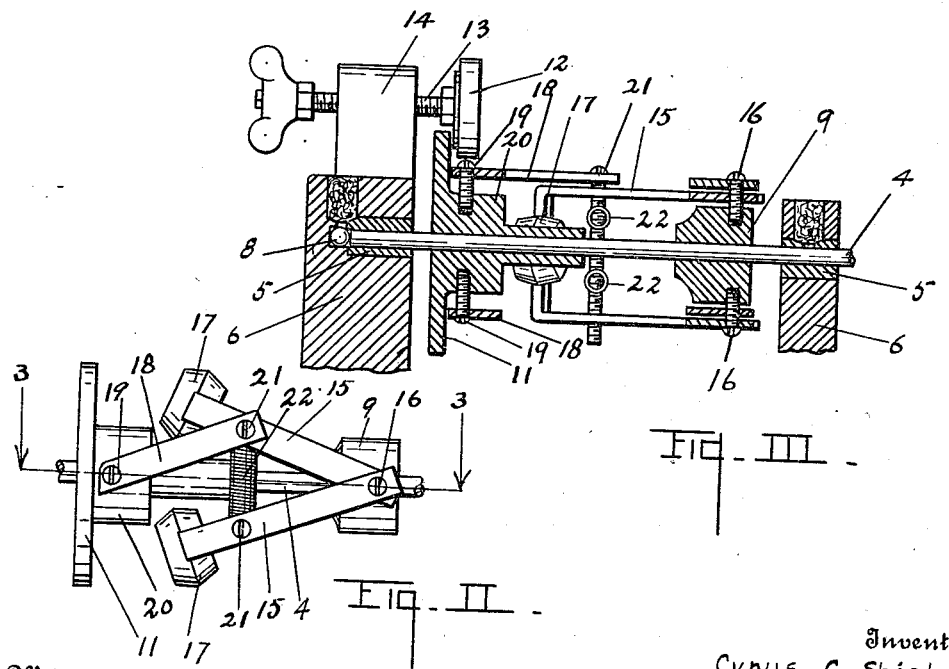
FIG. III.
FIG. II.
Witness
M. Louise Thurston
Lenn Gilman
Inventor
Cyrus C. Shigley
By Chappell Earl
Attorneys Patented May 1, 1923.

1,453,890

UNITED STATES PATENT OFFICE.

CYRUS C. SHIGLEY, OF GRAND RAPIDS, MICHIGAN, ASSIGNOR TO ELECTRIC PHONOGRAPH COMPANY, OF KALAMAZOO, MICHIGAN.

SPEED-REGULATING DEVICE.

Application filed May 14, 1920. Serial No. 381,356.

*To all whom it may concern:*

Be it known that I, CYRUS C. SHIGLEY, a citizen of the United States, residing at Grand Rapids, county of Kent, State of Michigan, have invented certain new and useful Improvements in Speed-Regulating Devices, of which the following is a specification.

This invention relates to improvements in speed regulating devices.

My improved speed regulating device is especially designed by me for regulating the speed of phonographs although adapted for use in other relations.

The main objects of this invention are to provide an improved speed regulating device for phonographs and the like which is very efficient and at the same time is simple and economical in structure and durable in use.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a side elevation of a structure embodying the features of my invention.

Fig. II is an enlarged detail plan view thereof.

Fig. III is a detail view partially in vertical section on a line corresponding to line 3—3 of Fig. II.

Referring to the drawing, my improved regulating device comprises the base 1 having spring supports 2 so that it may be mounted in a phonograph cabinet or casing, the springs absorbing the vibration of the motor.

The motor 3 is mounted at one end of the base. The governor spindle 4 is mounted in bearings 5 carried by the bearing pedestals 6 on the base. The spindle 4 is arranged in alignment with the driving shaft 7 which is a coiled spring, one end being connected to the motor shaft and the other to the spindle as indicated in Fig. I.

The spindle is provided with a thrust bearing ball 8. The collar 9 is secured or fixed to the spindle rotating therewith by means of the screw 10. The friction disk 11 is slidably mounted on the spindle 4 to coact with the friction member 12 which is adjustably mounted by means of the screw 13 arranged through the projection 14 on the outer bearing pedestal 6.

I provide a pair of U-shaped governor arms 15 which are disposed to embrace the collar 9 and secured thereto by the oppositely disposed pivots 16. The governor weights 17 are mounted on the cross portions of the governor arms 15. The disk 11 is provided with a hub portion 20 carrying oppositely disposed screws 19 engaging the links 18. The links are connected to the governor arms by means of one of the the screws 21 which extend from one side member to the other of the governor arms. Coiled springs 22 are engaged with these screws to hold the governor weights yieldingly inward, the eyes in the ends of the spring engaging the threads of the screws preventing their slipping on the screws.

The governor shaft is provided with a pinion 23 meshing with the gearing 24 having a pulley 25 on one side thereof.

With this arrangement of parts, I provide a governor or regulating means which is very sensitive and at the same time simple and durable in its parts.

I have illustrated and described my improvements in an embodiment or adaptation which I find very practical. I have not attempted to illustrate or describe certain modifications in structural details which I contemplate as I believe the disclosure made will enable those skilled in the art to which my invention relates to embody or adapt the same as may be desired.

Having thus described my invention what I claim as new and desire to secure by Letters Patent is:

1. In a structure of the class described, the combination with a coiled spring driving shaft, of a governor spindle aligned with and connected to said driving shaft and provided with a driving pinion, a friction disk slidably mounted on said spindle, a collar fixed to said spindle, a pair of U-shaped governor arms having governor weights on their cross portions disposed with their arms embracing said collar, oppositely disposed pivots for said governor arms carried by said collar, a link connecting each of said governor arms to said friction disk, said links being disposed oppositely, screws extending across said governor arms and constituting attaching pivots for said links, a pair of coiled springs disposed on the opposite sides of the spindle with their ends engaged with said screws, and a friction member mounted for adjustment to coact with said friction disk.

2. In a structure of the class described, the combination with a coiled spring driving shaft, of a governor spindle aligned with and connected to said driving shaft and provided with a driving pinion, a friction disk slidably mounted on said spindle, a collar fixed to said spindle, a pair of U-shaped governor arms having governor weights on their cross portions disposed with their arms embracing said collar, oppositely disposed pivots for said governor arms carried by said collar, a link connecting each of said governor arms to said friction disk, said links being disposed oppositely, a spring connecting said arms, and a friction member mounted for adjustment to coact with said friction disk.

3. In a structure of the class described, the combination of a driven governor spindle, a friction disk slidably mounted on said spindle, a collar fixed to said spindle, a pair of U-shaped governor arms having governor weights on their cross portions disposed with their arms embracing said collar and pivotally mounted thereon, a link connecting each of said governor arms to said friction disk, said links being disposed oppositely, screws extending across said governor arms and constituting attaching pivots for said links, a pair of coiled springs disposed on the opposite sides of the spindle with their ends engaged with said screws, and a friction member mounted for adjustment to coact with said friction disk.

4. In a structure of the class described, the combination of a driven governor spindle, a friction disk slidably mounted on said spindle, a collar fixed to said spindle, a pair of U-shaped governor arms having governor weights on their cross portions disposed with their arms embracing said collar and pivotally mounted thereon, a link connecting each of said governor arms to said friction disk, said links being disposed oppositely, and a friction member mounted on a screw for adjustment to coact with said friction disk.

5. In a structure of the class described, the combination of a driven governor spindle, a friction disk slidably mounted on said spindle, a collar fixed to said spindle, a pair of U-shaped governor arms having governor weights on their cross portions disposed with their arms embracing said collar and pivotally mounted thereon, a link connecting each of said governor arms to said friction disk, said links being disposed oppositely, and a friction member mounted to coact with said friction disk.

In witness whereof, I have hereunto set my hand and seal in the presence of two witnesses.

CYRUS C. SHIGLEY. [L. S.]

Witnesses:
 EDWARD W. ADAMS,
 HARVEY W. ALLEN.